United States Patent
Kii

(10) Patent No.: US 9,283,983 B2
(45) Date of Patent: Mar. 15, 2016

(54) TILT STEERING SYSTEM

(71) Applicant: NSK LTD., Shinagawa-ku, Tokyo (JP)

(72) Inventor: Hiroyuki Kii, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 14/430,777

(22) PCT Filed: Nov. 15, 2013

(86) PCT No.: PCT/JP2013/080948
§ 371 (c)(1),
(2) Date: Mar. 24, 2015

(87) PCT Pub. No.: WO2014/112196
PCT Pub. Date: Jul. 24, 2014

(65) Prior Publication Data
US 2015/0251682 A1    Sep. 10, 2015

(30) Foreign Application Priority Data
Jan. 15, 2013 (JP) ................................. 2013-004187

(51) Int. Cl.
*B62D 1/184* (2006.01)
*B62D 1/189* (2006.01)

(52) U.S. Cl.
CPC ............... *B62D 1/184* (2013.01); *B62D 1/189* (2013.01)

(58) Field of Classification Search
CPC ................................. B62D 1/189; B62D 1/184
See application file for complete search history.

(56) References Cited

U.S. PATENT DOCUMENTS

| 4,541,298 A | 9/1985 | Strutt |
| 7,252,019 B2* | 8/2007 | Lee ........................ B62D 1/184 248/229.21 |
| 2002/0011725 A1* | 1/2002 | Lutz ....................... B62D 1/184 280/779 |
| 2006/0243084 A1 | 11/2006 | Osawa et al. |
| 2006/0267328 A1 | 11/2006 | Eggers et al. |

(Continued)

FOREIGN PATENT DOCUMENTS

| EP | 0 751 058 B1 | 1/1997 |
| JP | 2001-18811 A | 1/2001 |

(Continued)

OTHER PUBLICATIONS

International Search Report dated Feb. 10, 2014 issued in International Application No. PCT/JP2013/080948 (PCT/ISA/210).

(Continued)

*Primary Examiner* — Paul N Dickson
*Assistant Examiner* — Darlene P Condra
(74) *Attorney, Agent, or Firm* — Sughrue Mion, PLLC

(57) ABSTRACT

A construction is realized in which a large difference in operation force to operate an adjustment lever 24a never occurs irrespective of a vertical position of a steering wheel and which is produced at low costs.
In part of a supporting plate portion 15a of a pair of left and right supporting plate portions 15a which make up a supporting bracket 14a, a thickness of a peripheral portion 34 which surrounds a vertically elongated hole 17a is made small at an upper portion and large at a lower portion. Additionally, a change in operation force of the adjustment lever 24a based on the difference in thickness and a change in the operation force based on a difference in rigidity of the supporting plate portion 15a are offset by each other to thereby solve the problem.

6 Claims, 9 Drawing Sheets

(56) References Cited

U.S. PATENT DOCUMENTS

| | | | | |
|---|---|---|---|---|
| 2008/0252056 A1* | 10/2008 | Moriyama | ............ | B62D 1/184 280/775 |
| 2011/0265599 A1* | 11/2011 | Owens | ................... | B62D 1/195 74/493 |
| 2015/0266497 A1* | 9/2015 | Yoshihara | .............. | B62D 1/184 74/493 |

FOREIGN PATENT DOCUMENTS

| | | | |
|---|---|---|---|
| JP | 2001-146874 | A | 5/2001 |
| JP | 2005-1562 | A | 1/2005 |
| JP | 2006-523565 | A | 10/2006 |
| JP | 2008-126750 | A | 6/2008 |
| JP | 2009-90894 | A | 4/2009 |
| JP | 2009-196500 | A | 9/2009 |
| JP | 2009-227181 | A | 10/2009 |
| JP | 2010-254159 | A | 11/2010 |
| JP | 2010-254234 | A | 11/2010 |
| JP | 2011-121443 | A | 6/2011 |
| JP | 2012-81804 | A | 4/2012 |
| JP | 2013-47088 | A | 3/2013 |
| WO | 2005037627 | A1 | 4/2005 |
| WO | 2009007709 | A1 | 1/2009 |
| WO | 2012017880 | A1 | 2/2012 |
| WO | 2012157703 | A1 | 11/2012 |
| WO | 2013015339 | A1 | 1/2013 |

OTHER PUBLICATIONS

Written Opinion dated Feb. 10, 2014 issued in International Application No. PCT/JP2013/080948 (PCT/ISA/237).

Search Report dated Oct. 29, 2015 issued by the European Patent Office in counterpart European Patent Application No. 13871800.2.

* cited by examiner

TILT STEERING SYSTEM

TECHNICAL FIELD

The present invention relates to an improved tilt steering system for adjusting the height position of a steering wheel according to the build and driving posture of a driver. Specifically, the invention is intended to realize a construction which can provide a large magnitude of force which is sufficient to hold the height position of the steering wheel in the adjusted position without particularly increasing an operation force to operate an operation lever. It is noted that the tilt steering system which is a target of this invention includes not only the construction in which only the height position of the steering wheel can be adjusted but also a so-called tilt and telescopic steering system in which a back-and-force position as well as a height position of a steering wheel can be adjusted.

BACKGROUND ART

A motor vehicle steering system is configured as shown in FIG. 7 so that a rotation of a steering wheel 1 is transmitted to an input shaft 3 of a steering gear unit 2 and a pair of left and right tie rods 4, 4 are pushed or pulled in association with the rotation of the input shaft 3 to impart a steering angle to front road wheels. The steering wheel 1 is supported and fixed to a rear end portion of a steering shaft 5. This steering shaft 5 is supported rotatably in a cylindrical steering column 6 in such a state that the steering shaft 5 is inserted through the steering column 6 in an axial direction. Additionally, a front end portion of the steering shaft 5 connects to a rear end portion of an intermediate shaft 8 via a universal joint 7, and a front end portion of the intermediate shaft 8 connects to the input shaft 3 via a different universal joint 9. It is noted that in the illustrated example, an electric power steering system is incorporated. Because of this, an electric motor 10, which constitutes a power source for supplying an assisting force, is provided at a front end portion of the steering column 6 by allowing the motor 10 to be supported on a housing 11 which is fixed to the front end portion of the steering column 6. Then, an output torque (an assisting force) of this electric motor 10 is imparted to the steering shaft 5 via a gear unit provided within the housing 11.

In general, in the steering system described above, a tilt mechanism is incorporated which adjusts the height position of the steering wheel 1 according the build and driving posture of a driver. As a steering system having the tilt mechanism described above, there are widely known constructions which are described, for example, in Patent Documents 1 to 3. Although the afore-said conventional construction depicted in FIG. 7 is like the constructions described in Patent Document 2 to 3, in the case of this conventional construction, an upper front end portion of the housing 11 is supported so as to oscillate to be displaced relative to a vehicle body 12 by a tilt shaft 13 which is disposed in a widthwise direction (a widthwise direction of the vehicle body on which the steering system is placed). Additionally, a supporting bracket 14 is placed at a portion close to a rear end of an axial intermediate portion (an area excluding both ends which differs from a central portion and which includes portions lying near end portions) of the steering column 6, and this supporting bracket 14 is supported on the vehicle body 12. This supporting bracket 14 includes a pair of left and right supporting plate portions 15 which are spaced apart in the widthwise direction and is supported on the vehicle body 12 in such a state that the portion lying close to the rear end of the axial intermediate portion of the steering column 6 is held by both the supporting plate portions 15 from both sides in the widthwise direction. In addition, a displacement bracket 16 is provided at a portion lying on a lower surface of the axial intermediate portion of the steering column 6 and held by both the supporting plate portions 15.

Additionally, vertically elongated holes 17 which have an arc-like shape centered at the tilt shaft 13 and which are long in a vertical direction are formed individually in both the supporting plate portions 15, and through holes 18 are formed in portions of the displacement bracket 16 which are aligned partially with the vertically elongated holes 17. Additionally, the construction shown in FIG. 7 incorporates a tilt and telescopic mechanism which tilt and telescopic steering system which can adjust a back-and-force position as well as a height position of the steering wheel 1, and therefore, the through holes 18 are made into elongated holes which are long in the axial direction of the steering shaft 5 and the steering column 6. The steering shaft 5 and the steering column 6 are constructed to extend and contract in association with the provision of the elongated holes 18. A more specific construction of the tilt steering system which incorporates the telescopic mechanism will be described by reference to FIGS. 8 to 9 which are disclosed in Japanese Patent Application No. 2011-214698.

The steering column 6 can extend and contract its whole length by allowing a rear portion of an inner column 20 which is disposed on a front side of the steering column 6 to slidably fit in a front portion of an outer column 19 which is disposed on a rear side thereof. Of the outer and inner columns, a slit 21 is provided in the front portion of the outer column 19 which is die-cast of, for example, a light alloy so that a bore diameter of the front portion can elastically be expanded and contracted. Additionally, a pair of left and right held plate portions 22, 22 are provided at portions which hold the slit 21 from left- and right-hand sides thereof, so that the displacement bracket 16 is made up of these held plate portions 22, 22. The through holes 18, 18 which are elongated in the longitudinal direction are formed individually in the held plate portions 22, 22. Additionally, the vertically elongated holes 17, 17 which have the partially arc-like shape centered at the tilt shaft 13 (refer to FIG. 7) and which are long in the vertical direction are formed in the pair of left and right supporting plate portions 15, 15 which are provided on the supporting bracket 14 so as to be disposed at the portions which hold the displacement bracket 16 from the left- and right-hand sides thereof. Then, a tilt rod member 23 such as a tilt bolt, a push-pull rod or the like is inserted through both the vertically elongated holes 17, 17 and both the through holes 18, 18 in the widthwise direction.

Further, an adjustment lever 24 (a tilt lever), an anchor portion 25 and a cam device 26 are provided on the tilt rod member 23 at an axial end portion, at the other axial end portion and at a portion lying close to one end of an axial intermediate portion, respectively, to thereby make up a tilt lock mechanism which expands and contracts a space defined between inner surfaces of the supporting plate portions 15, 15 based on the oscillation of the adjustment lever 24. The anchor portion 25 is something like a head portion of a bolt which is provided at the other end portion of the tilt rod member 23 and has a circular disk-like shape as a whole. Then, a first engagement projecting portion formed on an inner surface of the anchor portion 25 is brought into engagement with the vertically elongated hole 17 (the right one in FIG. 9) which is one of the vertically elongated holes 17 so as to be displaced only along the vertically elongated hole 17.

Consequently, the tile rod member 23 can move up and down along both the vertically elongated holes 17, 17 but never rotates about an axis thereof.

Additionally, the cam device 26 is made up of a combination of a drive cam 28 and a driven cam 29 (a presser member). These cams 28, 29 have center holes through which the tilt rod member 23 is inserted and are formed into a circular ring shape as a whole. In addition, a drive-side cam surface and a driven-side cam surface, which are a circumferential recess and a circumferential projection, respectively, are formed on surfaces of the cams 28, 29 which face each other. Additionally, a second engagement projecting portion 30 which is formed on an inner surface (a side surface lying centrally with respect to the widthwise direction of the steering column 6) of the driven cam 29 is brought into engagement with the vertically elongated hole 17 (the left one in FIG. 9) which is the other of the vertically elongated holes 17 so as to be displaced only along the vertically elongated hole 17. Consequently, the driven cam 29 can also move up and down along the vertically elongated hole 17 but never rotates about an axis thereof. Further, the drive cam 28 is connected to be fixed to a proximal end portion of the adjustment lever 24 so as to rotate backwards and forwards around a circumference of the tilt rod member 23 as the adjustment lever 24 oscillates backwards and forwards. Additionally, a thrust bearing 32 is provided between a nut 31 which is securely screwed on the other end portion of the tilt rod member 23 and an outer surface (a side surface lying outboard with respect to the widthwise direction of the steering column 6) of the proximal end portion of the adjustment lever 24 so as to enable the drive cam 28 to oscillate backwards and forwards while bearing a thrust load exerted on the drive cam 28. The nut 31 is crimped or the like so as to be prevented from being loosened.

When adjusting the position of the steering wheel 1, an axial dimension of the cam device 26 is contracted by oscillating the adjustment lever 24 in a predetermined direction (in general, in a downward direction), so as to expand a space defined between the driven cam 29 and the anchor portion 25. As a result of this, a surface contact pressure at abutment portions between the inner surfaces of the supporting plate portions and outer surfaces of the held plate portions 22, 22 is reduced or lost, and at the same time, the bore diameter of the front end portion of the outer column 19 is elastically expanded, whereby a surface contact pressure at an abutment portion between an inner circumferential surface of a front end portion of the outer column 19 and an outer circumferential surface of a rear end portion of the inner column 20 is reduced. In this state, a vertical position and a longitudinal position of the steering wheel 1 can be adjusted within ranges where the tilt rod member 19 is allowed to move within the vertically elongated holes 17, 17 and the through holes 18, 18. After the steering wheel 1 is moved to a desired position, the adjustment lever 24 is caused to oscillate in a reverse direction (in general, in an upward direction) to expand the axial dimension of the cam device 26 to thereby contract a space defined between the inner surfaces of the supporting plate portions 15, 15. This increases the surface contact pressure at the abutment portions between the inner surfaces of the supporting plate portions 15, 15 and the outer surfaces of the held plate portions 22, 22, and at the same time, the bore diameter of the front end portion of the outer column 19 is contracted elastically to increase the surface contact pressure at the abutment portion between the inner circumferential surface of the front end portion of the outer column 19 and the outer circumferential surface of the rear end portion of the inner column 20, whereby the steering wheel 1 can be held in the adjusted position.

Various mechanisms which can adjust the position of a steering wheel and hold the steering wheel in an adjusted position by adjusting a force which presses against outer surfaces of a pair supporting plate portions which make up a supporting bracket are known in addition to the construction shown in FIGS. 8 to 9. For example, a construction is also known in which a tilt rod member is allowed to rotate about an axis thereof. When this construction is adopted based on the construction shown in FIGS. 8 to 9, a thrust bearing is provided between the anchor portion 25 and an outer surface of one of the supporting plate portions 15, and the proximal end portion of the adjustment lever 24 is connected to be fixed to the other end portion of the tilt rod member 23. Further, a construction similar to the construction shown in FIGS. 8 to 9 is also known in which a first engagement projecting portion 27 which is provided on an inner surface of a anchor portion 25 is brought into engagement with one of vertically elongated holes 17 so as to be displaced only along this vertically elongated hole 17, and a nut 31 (a presser member) which is securely screwed on the other end portion of a tilt rod member 23 is connected to be fixed to a proximal end portion of an adjustment lever 24. In the case of these constructions, the nut 31 is rotated by the adjustment lever 24 so as to expand or contract a space defined between the nut 31 and the anchor portion 25. In the case of either of the constructions, the engagement projecting portion needs to be brought into engagement with the vertically elongated hole so as to be displaced only along the vertically elongated hole with the tilt rod member prevented from rotating about the axis thereof at least at one location.

In the case of either of the constructions, to ensure a sufficient force to hold the steering wheel in the adjusted position, the surface contact pressure at the abutment portions between the inner surfaces of the supporting plate portions 15, 15 and the outer surfaces of the displacement bracket 16 needs to be ensured in such a state that the space defined between the anchor portion 25 and the presser portion such as the driven cam 29 is contracted by operating the adjustment lever 24. Then, in order to ensure the surface contact pressure at both the abutment portions, a space between portions of the supporting plate portions 15, 15 which hold the displace bracket 16 therebetween needs to be contracted in an ensured fashion. As shown in FIGS. 7 to 9, in the case of the construction in which the displacement bracket 16 is provided on a lower side of the steering column 6, it is relatively easy to ensure the surface contact pressure at the abutment portions. This is because even when the steering wheel 1 is positioned at an upper end of an adjustment range thereof, the portions of the supporting plate portions 15, 15 which hold the displacement bracket 16 therebetween are spaced away from upper ends of the supporting plate portions 15, 15 and the rigidity against effort to move those portions towards each other is suppressed to a low level.

In contrast to this, as described in, for example, Patent Document 4, in a construction in which a displacement bracket is provided on an upper side of a steering column, when a steering wheel is positioned at an upper end of an adjustment range thereof, it becomes difficult to ensure a surface contact pressure at abutment portions between inner surfaces of supporting plate portions and outer surfaces of the displacement bracket. Namely, as depicted in FIGS. 1 to 2 which show an embodiment of the invention, a construction is considered in which a displacement bracket 16a is provided on an upper side of an outer column 19 which makes up a steering column 6a. This construction is advantageous in that the degree of freedom in designing a protection for knees of a driver when a vehicle is involved in a collision is enhanced by such an extent that the displacement bracket 16a does not project downwards of the steering column.

However, when the displacement bracket 16a is provided on the upper side of the outer column 19a as described above, the displacement bracket 16a is situated near upper end portions (proximal end portions) of a pair supporting plate portions 15a, 15b which make up a supporting bracket 14a. When a space defined between an anchor portion 25 and a driven-side cam 29 (refer to FIG. 9 for the driven cam 29) of a cam device 26 is contracted by operating an adjustment lever 24a, the supporting plate portions 15a, 15b are displaced about the upper end portions thereof. The rigidities of the supporting plate portions 15a, 15b become higher as they extend towards the upper end portions thereof. Therefore, in the construction shown in FIGS. 1 to 2, when attempting to ensure a surface contact pressure at both the abutment portions with a steering wheel positioned at an upper end of an adjustment range thereof, a large operating force needs to be exerted on the adjustment lever 24a. In this way, the fact that a large difference in operating force of the adjustment lever 24a is produced depending upon whether the steering wheel 1 is positioned in an upper or lower position is not preferable since a driver who operates the adjustment lever 24a is caused to feel a sensation of physical disorder.

The sensation of physical disorder described above can, of course, be mitigated by adopting a configuration in which a height dimension of the supporting plate portions 15a, 15b is increased so as to ensure a distance between the displacement bracket 16a and the upper end portions of the supporting plate portions 15a, 15 even with the steering wheel positioned at the upper end of the adjustment range thereof. However, this means cannot be adopted in many cases excluding a case where extra space is available for placement of a steering system since a position where the steering column 6a is placed is situated on a lower side as long as a height position of a portion provided on the side of a vehicle body where the supporting bracket 14a is assembled remains the same.

In the case of the construction described in Patent Document 4, upper half portions of inner surfaces of the anchor portion and the driven-side cam are depressed further than lower half portions, or peripheral portions of upper end portions of vertically elongated holes on outer surfaces of a pair of supporting plate portions are depressed. However, in the case of the former construction, since a direction in which the anchor portion and the driven-side cam are assembled is limited (they cannot be assembled in a vertically reverse direction), the efficiency of assembling work is reduced. In addition, in the case of the latter construction, not only is an extra step of depressing the outer surfaces of the supporting plate portions through surface pressing necessary but also a step is necessary of removing burrs which are produced in association with the surface pressing, resulting in an increased production cost. Additionally, in either of the constructions, it is not possible to make a fine adjustment of a force necessary to operate the adjustment lever, and hence, the difference in operation force to operate the adjustment lever which is caused in association with the difference in vertical position of the steering wheel cannot necessarily be eliminated sufficiently. Further, in the case of either of the constructions, abutment areas between the inner surfaces of the anchor portion and the driven-side cam and the outer surfaces of the supporting plate portions are narrowed to increase the surface contact pressure at the abutment portions, and therefore, these inner surfaces and outer surfaces are plastically deformed easily. Then, when they are plastically deformed, it is not possible to effect a smooth adjustment of the vertical position of the steering wheel.

RELATED ART REFERENCE

Patent Document

Patent Document 1: JP-A-2009-227181
Patent Document 2: JP-A-2010-254159
Patent Document 3: JP-A-2011-121443
Patent Document 4: JP-A-2005-001562

SUMMARY OF THE INVENTION

Problems to be Solved by the Invention

The invention has been made in view of the situations described above to realize a construction which eliminates the occurrence of a large difference in operation force necessary to operate an adjustment lever whether a steering wheel is situated in an upper or lower vertical position and which is fabricated at low costs.

Means for Solving the Problems

A tilt steering system of the invention is designed to eliminate the occurrence of a large difference in operation force necessary to operate an adjustment lever whether a steering wheel is situated in an upper or lower vertical position by making a sum of thicknesses of a pair of left and right supporting plate portions which hold a displacement bracket from both sides in a widthwise direction thereof on a mounting plate portion side which constitutes a proximal end side of the supporting plate portions thinner than a sum of thicknesses of the pair of left and right supporting plate portions on a non-mounting plate portion side which constitutes a distal end side of the supporting plate portions.

Specifically, a tilt steering system of the invention includes a steering column, a displacement bracket, a steering shaft, a supporting bracket, a pair of vertically elongated holes, through holes, a tilt rod member, an anchor portion, a tilt lever, and a presser member.

In these constituent components, the steering column oscillates to be displaced about a tilt shaft which is provided in a widthwise direction in a front portion.

Further, the displacement bracket is fixed to an axial intermediate portion of the steering column.

Further, the steering shaft is supported rotatably on a bore diameter side of the steering column, and a steering wheel is fixed to a rear end portion which projects from a rear opening of the steering column.

Further, the supporting bracket has a mounting plate portion which is provided at a vertical end portion thereof and a pair of supporting plate portions which are provided to extend either upwards or downwards from the mounting plate portion in such a state that the supporting plate portions are space apart from each other in the widthwise direction. Then, the supporting bracket is supported on a vehicle body by the mounting plate portion in such a state that the displacement bracket is held from both sides thereof in the widthwise direction by both the supporting plate portions.

Further, the vertically elongated holes are provided in portions of the supporting plate portions which are aligned with each other and are long in the vertical direction.

Further, the through holes are formed in portions of the displacement bracket which are aligned with the vertically elongated holes so as to penetrate the displacement bracket in the widthwise direction.

Further, the tilt rod member is inserted through the vertically elongated holes and the through holes in the widthwise direction.

Further, the anchor portion is provided at one end portion of the tilt rod member.

Further, the tilt lever is provided at the other end portion of the tilt rod member.

Further, the presser member expands and contracts a space defined between the anchor portion and itself based on oscillation of the tilt lever.

In particular, in the tile steering system of the invention, at least the supporting plate portion of the supporting plate portions is made into an enequal-thickness supporting plate portion which differs partially in thickness. In a portion of the unequal-thickness supporting plate portion which includes a peripheral portion of the vertically elongated hole formed in the unequal-thickness supporting plate portion and which is pressed against by the anchor portion or the presser member which faces oppositely an outer surface of the unequal-thickness supporting plate portion, a thickness of a portion which lies near the mounting plate portion is made thinner than a thickness of a portion which lies away from the mounting plate portion.

When carrying out the invention described above, the mounting plate portion may be provided at an upper end portion of the mounting bracket. Additionally, the supporting plate portions may be provided so as to be suspended downwards from the mounting plate portion, and the displacement bracket may be provided on an upper side of the steering column. In addition, in the peripheral portion of the vertically elongated hole formed in the unequal-thickness supporting plate portion, a thickness of an upper portion may be made smaller than a thickness of a lower portion.

Further, when carrying out the invention described above, the thickness of the lower portion may be a thickness of a material of the unequal-thickness supporting plate portion, and the thickness of the upper portion may be smaller than the thickness of the material.

Further, a thickness of the peripheral portion of the vertically elongated hole in the unequal-thickness supporting plate portion may be reduced gradually from a downward portion towards an upward portion thereof.

Further, a degree at which the thickness of the peripheral portion of the vertically elongated hole in the unequal-thickness supporting plate portion may be constant along a full vertical length thereof or the degree at which the thickness of the peripheral portion of the vertically elongated hole in the unequal-thickness supporting plate portion may be changed at an intermediate portion along the vertical length thereof.

Further, according to the invention, there is provided a tilt steering system characterized by including a steering column which oscillates to be displaced about a tilt shaft which is provided in a widthwise direction, a displacement bracket which is fixed to an axial intermediate portion of the steering column, a steering shaft which is supported rotatably on a bore diameter side of the steering column and which fixes a steering wheel to a rear end portion of the steering column, a first supporting plate portion which extends either upwards or downwards from a mounting plate portion which is provided on a vehicle body, a second supporting plate portion which extends either upwards or downwards from the mounting plate portion and which is provided so as to be spaced apart from the first supporting plate portion in the widthwise direction, a supporting bracket which is supported on the vehicle body by the mounting plate portion in such a state that the displacement bracket is held from both sides thereof in the widthwise direction by the first and second supporting plate portions, a first vertically elongated hole which is long in a vertical direction and which is provided in the first supporting plate portion, a second vertically elongated hole which is provided in a portion of the second supporting plate portion which is aligned with the first vertically elongated hole, through holes which penetrate through portions of the displacement bracket which are aligned with the first and second vertically elongated holes, a tilt rod member which is inserted through the through holes, an anchor portion which is provided on the tilt rod member so as to face oppositely a first location on an outer surface of the first supporting plate portion, and a presser member which faces oppositely a second location on an outer surface of the second supporting plate portion so as to expand and contract a space defined between the anchor portion and itself based on oscillation of a tilt lever, and characterized in that a space defined between the first location and the second location is smaller at a portion which lies near to the mounting plate portion that at a portion which lies far away from the mounting plate portion.

Further, a configuration may be adopted in which the mounting plate portion is provided at an upper end portion of the supporting bracket, the first supporting plate portion and the second supporting plate portion are provided so as to be suspended downwards from the mounting plate portion, the displacement bracket is provided on an upper side of the steering column, and a thickness of an upper portion of at least one of the first location and the second location is smaller than a thickness of a lower portion.

Further, a configuration may be adopted in which the thickness of the lower portion is the same as a thickness of a material of at least one of the first supporting plate portion and the second supporting plate portion.

Further, a configuration may be adopted in which a change in thickness from the lower portion to the upper portion is constant along a vertical full length of the first location or the second location.

Further, a configuration may be adopted in which the thickness from the lower portion to the upper portion changes at an intermediate portion along the vertical length.

Further, a configuration may be adopted in which at least one of the first location and the second location is formed through pressing.

Further, a configuration may be adopted in which the first location is formed integrally with the first supporting plate portion of the same material as that of the first supporting plate portion, and the second location is formed integrally with the second supporting plate portion of the same material as that of the second supporting plate portion.

Advantage of the Invention

According to the invention described heretofore, it is possible to realize the tilt steering system which eliminates the occurrence of a large difference in operation force necessary to operate the adjustment lever whether the steering wheel is situated in the upper or lower position.

Namely, in the pair of supporting plate portions which hold the displacement bracket fixed to the steering column therebetween, the sum of the thicknesses of the portions which are held by the anchor portion and the presser member is smaller on the mounting plate portion side where the rigidity of the supporting plate portions is high than on the non-mounting plate portion side where the rigidity of the supporting plate portions is low. Additionally, a reaction force produced in association with contracting the space between the anchor portion and the presser member by rotating the adjustment lever tends to be smaller on the mounting plate portion side by such an extent that the sum of the thicknesses is so small. In addition, this reaction tends to be larger on the side where the rigidity is high than on the side where the rigidity is low, and therefore, these tendencies are offset by each other so that the reaction force is allowed to remain almost constant. The operation force required to rotate the adjustment lever is almost in proportion to the reaction force, and therefore, the operation force is allowed to remain almost constant by causing the reaction force to remain almost constant, thereby making it possible to mitigate or eliminate the sensation of physical disorder felt by the driver who operates the adjustment lever.

In addition, the reaction force changes largely as a result of a slight change in the sum of the thicknesses. Consequently, the thickness of the unequal-thickness supporting plate portion only has to be changed slightly along the vertically elongated hole, and the thickness of the peripheral portion of the vertically elongated hole can be changed to a desired value easily at the same time that the unequal-thickness supporting plate portion is bent or punched through pressing. Additionally, there is imposed no limitation on the assembling direction of both the anchor portion and the presser portion. Consequently, the production costs are never increased. In addition, the operation force necessary to operate the adjustment lever can be adjusted finely by changing the degree at which the thickness of the peripheral portion changes, and therefore, the difference in operation force of the adjustment lever associated with the difference in vertical position of the steering wheel can be eliminated sufficiently. Further, the inner surfaces of the anchor portion and the presser portion are in abutment with the outer surfaces of the supporting plate portions over the sufficient area. Consequently, the areas of the abutment portions between the inner surfaces of the anchor portion and the presser member and the outer surfaces of the supporting plate portions are not increased excessively, whereby the steering wheel can smoothly be adjusted with respect to its vertical position by suppressing the plastic deformation of the inner surfaces and the outer surfaces.

BRIEF DESCRIPTION OF THE DRAWINGS

FIG. 3 is a side view of a removed supporting bracket alone as seen in the same direction as that in which FIG. 1 is seen.

MODES FOR CARRYING OUT THE INVENTION

Figure 1:
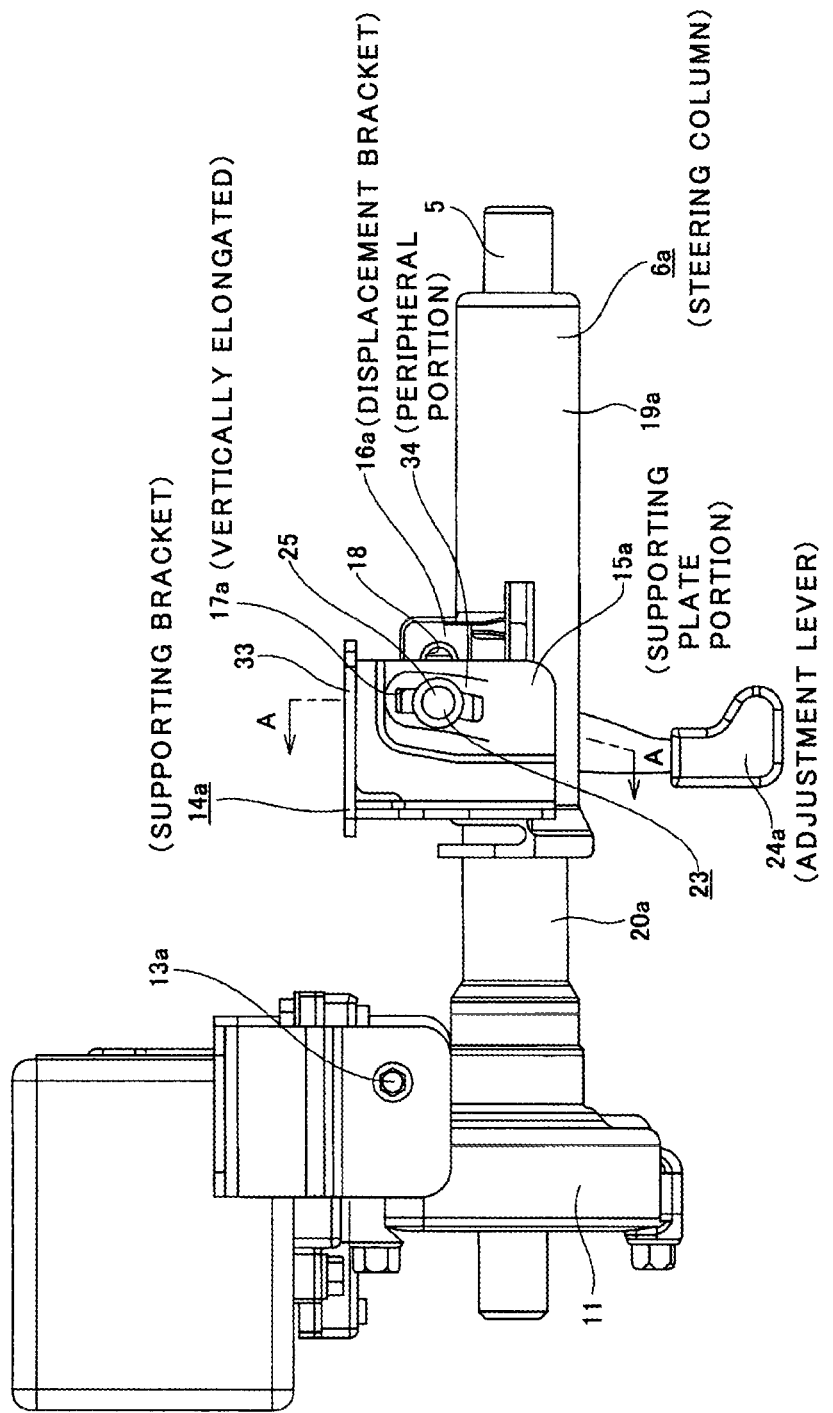
FIG. 1 shows a side view of an embodiment of the invention.
Figure 2:
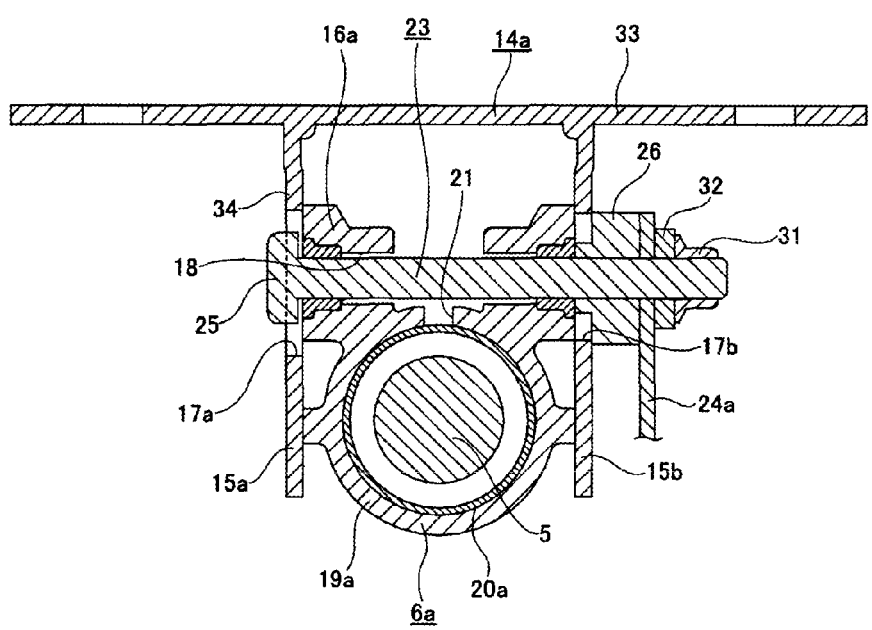
FIG. 2 is a sectional view taken along the line A-A in FIG. 1 with a part thereof omitted or simplified.
Figure 3:
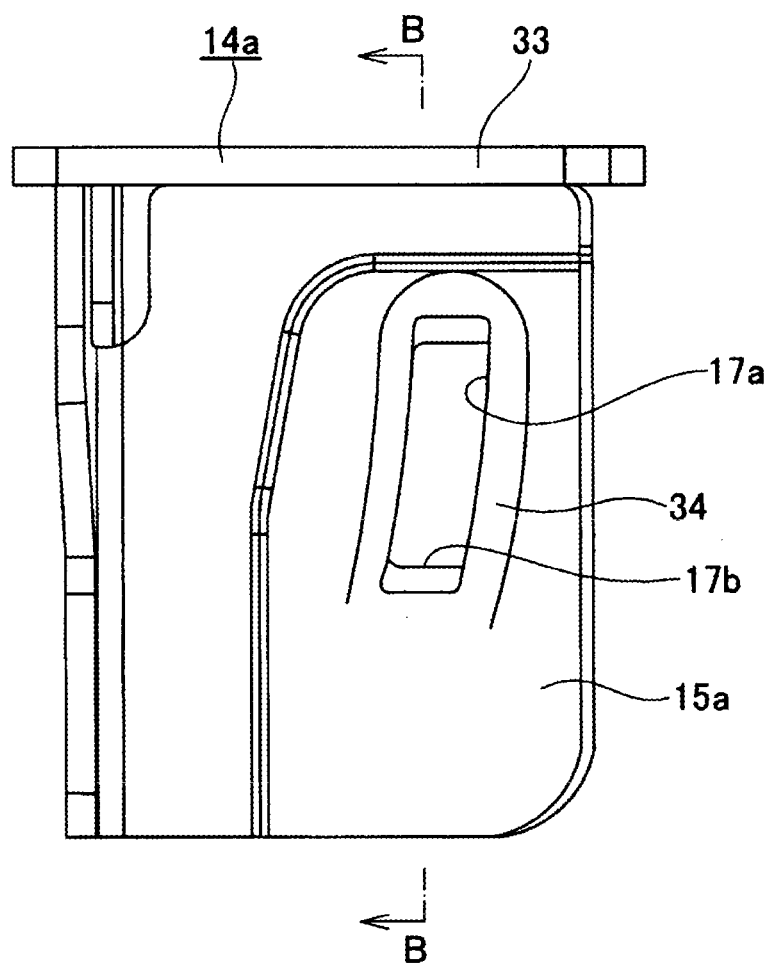

FIGS. 1 to 4 show an embodiment of the invention. A construction of this embodiment includes a telescopic mechanism which adjusts a longitudinal position of a steering wheel 1 (refer to FIG. 1) as well as a tilt mechanism which adjust a vertical position thereof. In order to include the telescopic mechanism, a steering column 6a is used in which a rear portion of an inner column 20a is fitted in a front portion of the outer column 19a so that the overall length thereof can be extended and contracted. Additionally, a displacement bracket 16a is fixed to an upper side of the front portion of the outer column 19a, and through holes 18 which are elongated in an axial direction of the outer column 19a are formed in this displacement bracket 16a. In addition, a slit 21 along the axial direction of the outer column 19a is formed in a widthwise central portion on an upper surface of a front portion of the displacement bracket 16a, so that a bore diameter of the front portion of the outer column 19a can be expanded and contracted by changing a force with which the displacement bracket 16a is held from left- and right-hand sides thereof. This conventional construction which makes up the telescopic mechanism is widely known and has nothing to do with the gist of the invention, and therefore, the detailed illustration and description thereof will be omitted or only the brief illustration and description thereof will be given here. Thus, hereinafter, characteristics of the invention will be described mainly.

A supporting bracket 14a which makes up the construction of this embodiment is such that a pair of supporting plate portions 15a, 15b are suspended downwards from a lower surface of a mounting plate portion 33 which is provided at an upper end portion thereof in such a state that the supporting plate portions 15a, 15b are spaced apart from each other in a widthwise direction. Vertically elongated holes 17a, 17b which have an arc-like shape which is centered at a tilt shaft 13a are formed in portions of the supporting plate portions 15a, 15b which are aligned with each other. It is noted that the mounting plate portion 33 is supported on a vehicle body in such a manner as to be dislocated therefrom by an impact load which is imparted thereto at the time of a secondary collision. The configuration described heretofore is the same as that of a general tilt steering system.

In particular, in the case of this embodiment, of the supporting plate portions 15a, 15b, the supporting plate portion 15a (the left one in FIG. 2) in which the vertically elongated hole 17a with which an anchor portion 25 provided at a proximal end portion (an end portion) of a tilt rod member 23 is brought into engagement is provided is made into an unequal-thickness supporting plate portion where its thickness differs from portion to portion. Additionally, a thickness of a peripheral portion 34 (refer to FIGS. 3 to 4 for details) of the vertically elongated hole 17a formed in the supporting plate portion 15a is made to change continuously in such a way that the thickness becomes smaller as it extends from bottom to top along the vertically elongated hole 17a. A range of the peripheral portion 34 where the thickness changes in the way described above extends to the whole of a portion which is likely to be brought into abutment with an inner surface of the anchor portion 25.

Figure 4:
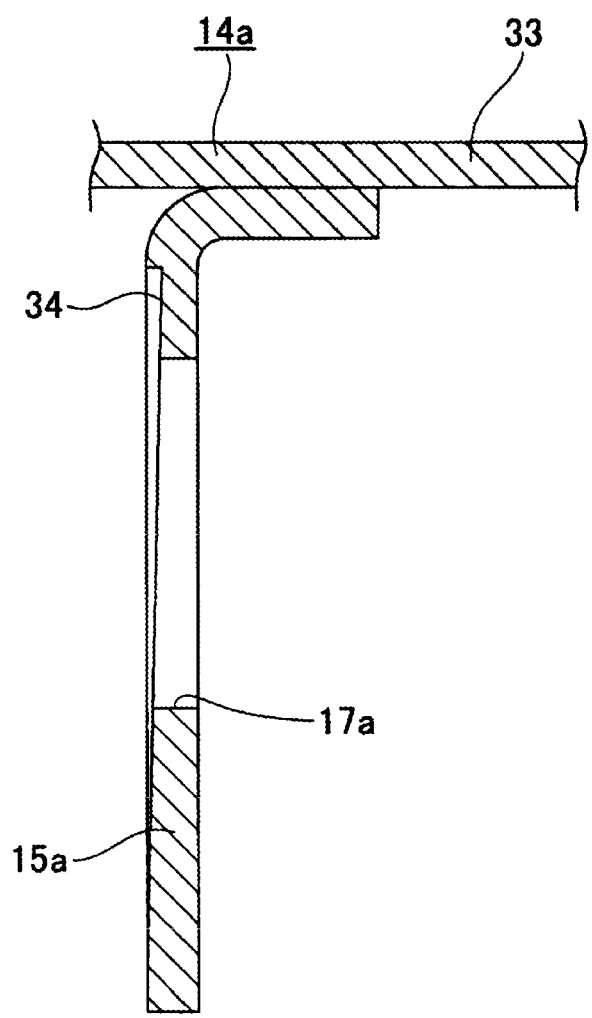
FIG. 4 is a drawing showing an example of a section taken along the line B-B in FIG. 3 with a part omitted.
Figure 5:
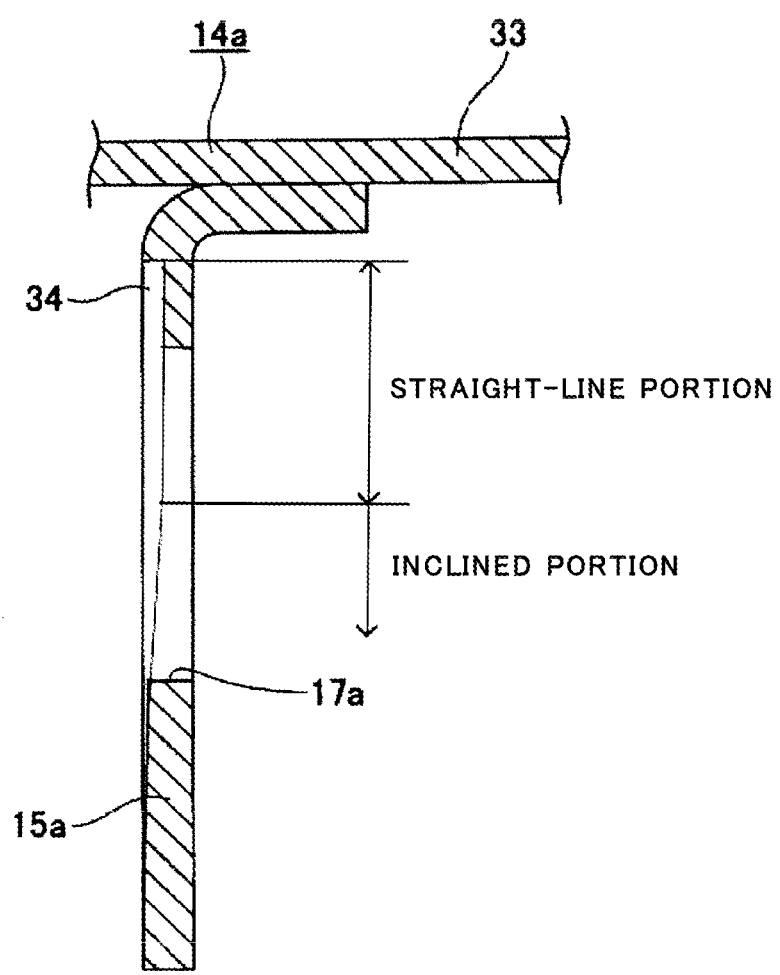
FIG. 5 is a drawing showing a different example of a section taken along the line B-B in FIG. 3 with a part omitted.

It is sufficient to have a slight degree at which the thickness changes between an upper end portion and a lower end portion of the peripheral portion 34. For example, when the supporting plate portion 15a is made of a sheet of cold-rolled steel (SPCC of JIS G 3141) having a thickness of the order of 3.2 mm, a difference in thickness between the upper end portion and the lower end portion of the peripheral portion 34 should be on the order of 0.2 mm. Namely, a thickness at the upper end portion of the peripheral portion 34 is 3.0 mm, while a thickness of the lower end portion thereof is 3.2 mm, and it is appropriate that a thickness of a middle portion changes continuously along a vertical direction between 3.0 mm and 3.2 mm. It is easy to set such a change in thickness in the sheet of cold-rolled steel through pressing, and moreover, this is executed at the same time that a different working step such as bending the supporting plate portion 15a is executed. The change in thickness of the peripheral portion 34 along the vertical direction may be constant along a vertical full length thereof as shown in FIG. 4, however, it is possible that the change in thickness is caused in the middle of the vertical direction as shown in FIG. 5. However, no such portion as a step which interrupts the sliding motion of the anchor portion 25 should be provided at the portion where the change is caused. In either case, the thickness of the other (the right one in FIG. 2) supporting plate portion 15b of the pair of supporting plate portions 15a, 15b is set constant (for example, set to remain at 3.2 mm which is the thickness of the material) along the overall length of the vertically elongated hole 17b. However, it is also possible that the thickness of the other supporting plate portion 15b changes along the vertical direction.

Figure 6:
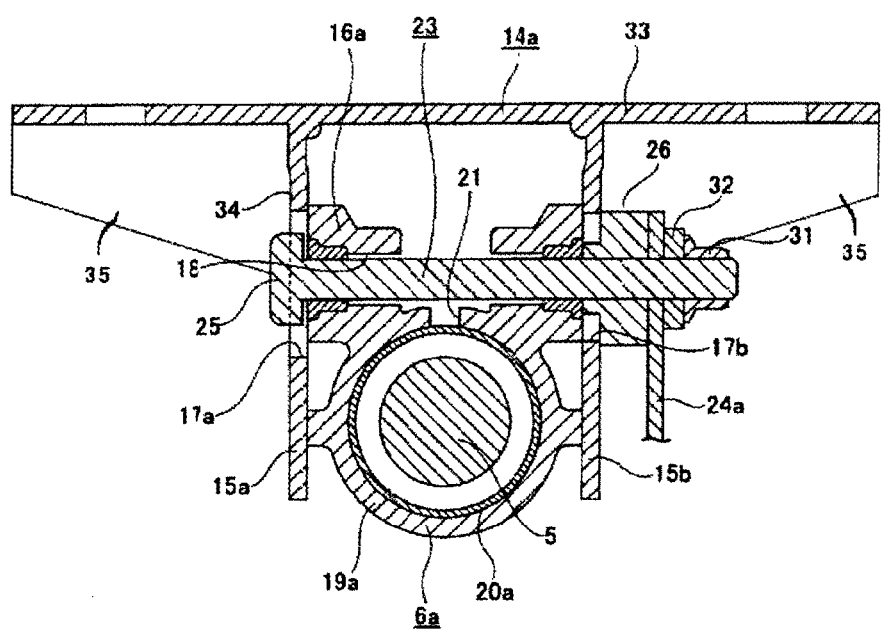
FIG. 6 is a side view showing an example in which a reinforcement plate is added to the configuration shown in FIG. 1.
Figure 7:
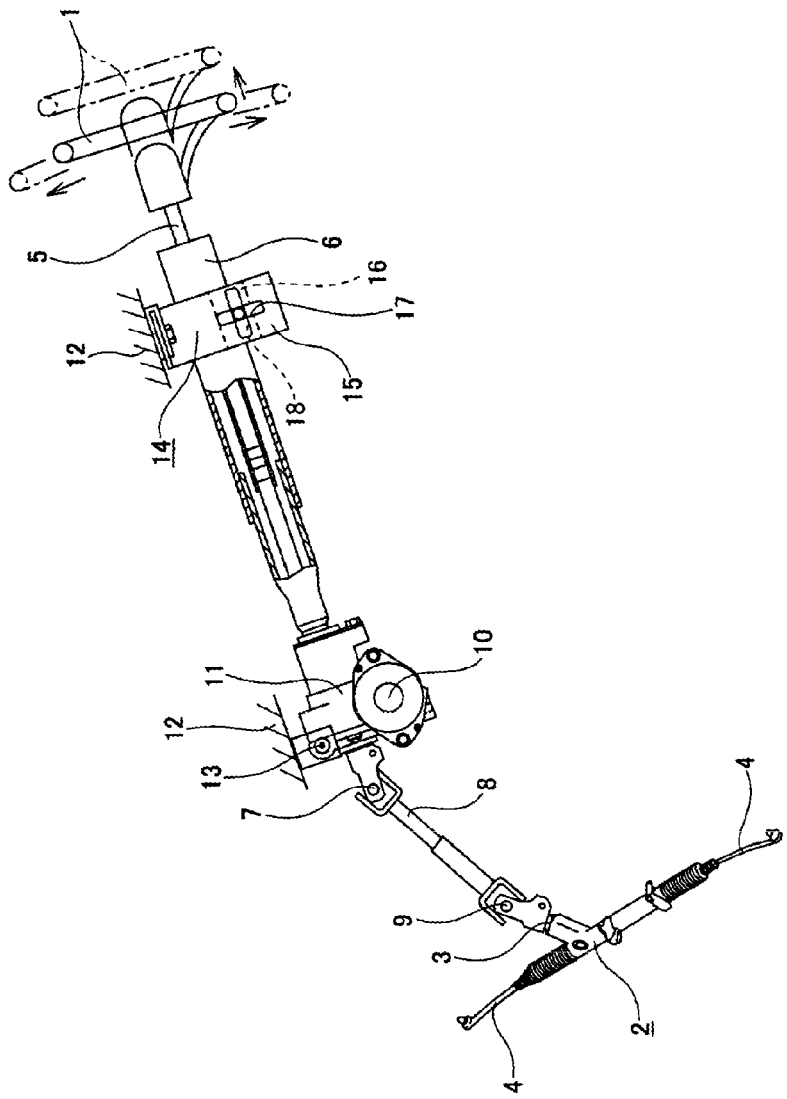
FIG. 7 is a partially cutaway schematic side view showing an example of a motor vehicle steering system which incorporates a tilt steering system.
Figure 8:
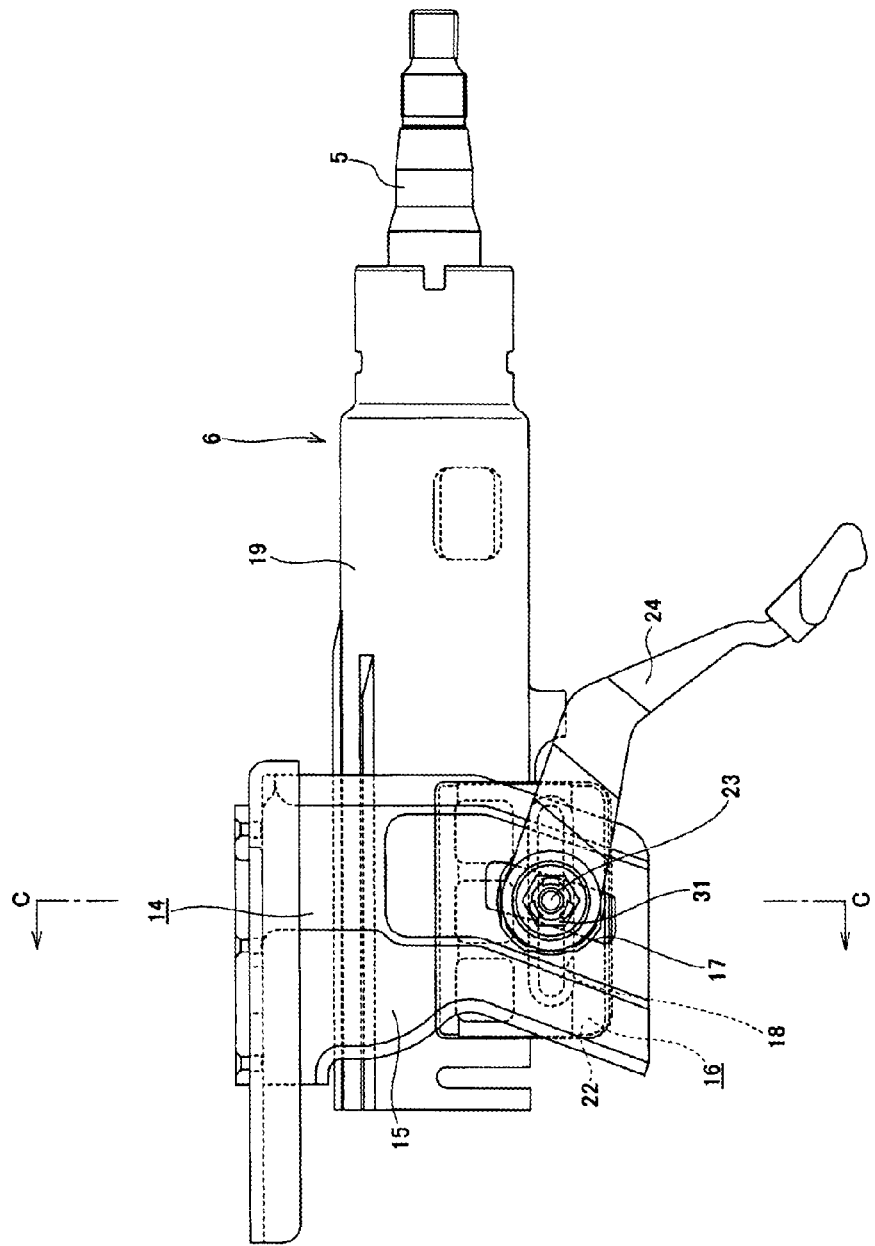
FIG. 8 is a side view of a main part of the example shown in FIG. 7.

Additionally, as shown in FIG. 6, a reinforcement plate 35 may be provided at the portion where the thickness of the supporting late portion 15a is reduced. For example, when the thickness of the peripheral portion 34 is made to change in the middle of the vertical direction by providing a straight-line portion and an inclined portion as shown in FIG. 5, the reinforcement plate 35 may be provided at a portion which corresponds to the straight-line portion. As this occurs, an originating point of the reinforcement plate corresponds to a contact point between the straight-line portion and the inclined portion.

According to the tilt steering system of the embodiment which is configured as has been described heretofore, it is possible to prevent the occurrence of a large difference in operation force necessary to operate an adjustment lever 24a whether the steering wheel 1 is situated in an upper or lower position. The reason for this will be described below.

Figure 9:
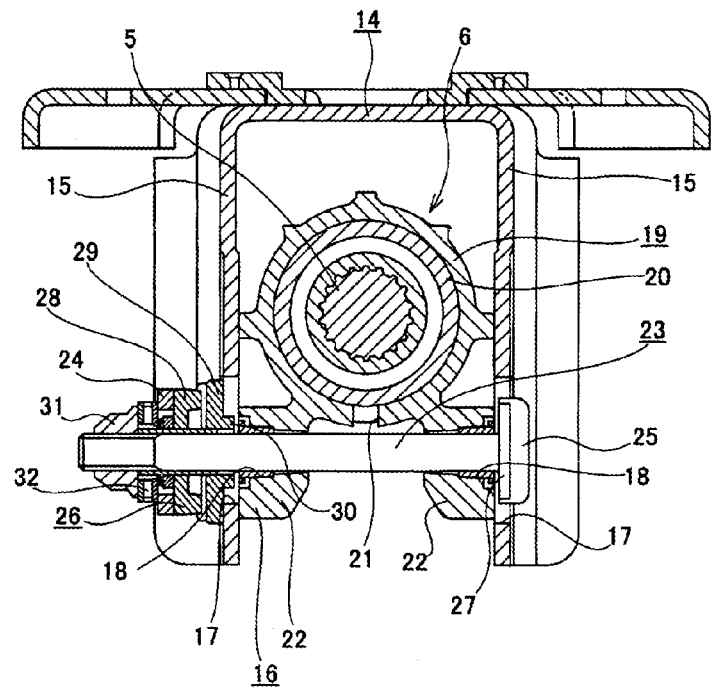
FIG. 9 is a sectional view taken along the line C-C in FIG. 8.

When adjusting the position of the steering wheel 1, the adjustment lever 24a is rotated downwards to contract an axial dimension of a cam device 26, and a space defined between an inner surface of a driven cam 29 (refer to FIG. 9 for the driven cam 29) of this cam device 26 and an inner surface of the anchor portion 25. When the steering wheel 1 is held in an adjusted position after the position of the steering wheel 1 has been adjusted in that state, the adjustment lever 24a is rotated upwards to expand the axial dimension of the cam device 26 to contract the space defined between the inner surface of the driven cam 29 and the inner surface of the anchor portion 25. In this state, the driven cam 29 and the anchor portion 25 hold therebetween the displacement bracket 16 which is fixed to the upper side of a front end portion of the outer column 19a via the supporting plate portions 15a, 15b. Then, inner surfaces of the supporting plate portions 15a, 15b and outer surfaces of the displacement bracket 16a are rubbed together strongly to hold the vertical position of the steering wheel 1 in the adjusted position. At the same time, the bore diameter at the front portion of the outer column 19a is contracted so that an inner circumferential surface of the front portion and an outer circumferential surface of the rear portion of the inner column 20a are rubbed together strongly, whereby the longitudinal position of the steering wheel 1 is held in an adjusted position.

With the adjustment lever 24a rotated upwards to hold the steering wheel 1 in the adjusted positions as described above, the space defined between the inner surface of the driven cam 29 and the inner surface of the anchor portion 25 remains constant irrespective of the position of the steering wheel 1. Consequently, the operation force necessary to rotate the adjustment lever 24a upwards becomes larger as a held portion thickness which is a sum of the thicknesses of the members which reside between the inner surface of the driven cam 29 and the inner surface of the anchor portion 25 becomes larger, and on the contrary, the operation force becomes smaller as the sum of the thicknesses of the members becomes smaller. In the case of the construction of this embodiment, since the thickness of the peripheral portion 34 of the supporting plate portion 15a which constitutes the held portion thickness becomes smaller towards the upper end portion thereof, the held portion thickness becomes smaller towards an upper part and becomes larger towards a lower part. Consequently, the operation force necessary to rotate the adjustment lever 24a upwards based on the held portion thickness becomes small when the steering wheel 1 is situated in the upper position, while the operation force becomes large when the steering wheel 1 is situated in the lower position.

On the other hand, in both the supporting plate portions 15a, 15b, the rigidity is high at an upper portion and low at a lower portion. Consequently, the operation force necessary to rotate the adjustment lever 24a upwards based on the rigidity of both the supporting plate portions 15a, 15b becomes larger when the steering wheel 1 is situated in the upper position, while the operation force becomes smaller when the steering wheel 1 is situated in the lower position.

In this way, the direction in which the operation force of the adjustment lever 24a changes based on the difference in thickness of the held portion becomes opposite to the direction in which the operation force changes based on the difference in rigidity between the held plate portions 15a, 15b. Consequently, the changes in both the directions are offset by each other, whereby the operation force can be made almost constant irrespective of the height position of the steering wheel 1, thereby making it possible to mitigate or eliminate the sensation of physical disorder felt by the driver. Additionally, the operation force of the adjustment lever 24a can be changed arbitrarily and finely by changing the degree at which the thickness of the peripheral portion 34 changes. Because of this, the difference in operation force of the adjustment lever 24a associated with the vertical position of the steering wheel 1 can be eliminated sufficiently.

In association with the configuration in which the held portion thickness is made small at the upper part and large at the upper part, the holding force to hold the steering wheel 1 in the adjusted position becomes small at the upper part and large at the lower part. However, although the difference in operation force of the adjustment lever 24a based on the difference in rigidity of the held plate portions 15a, 15b between the upper portion and the lower portion thereof makes the driver feel the sensation of physical disorder when it remains uncared, the sensation of physical disorder so felt is not extremely large. Additionally, the operation force of the adjustment lever 24a which changes based on the held portion thickness changes largely by changing slightly the held portion thickness. Consequently, even when the steering wheel 1 is moved to an upper end position within an adjustable range, the steering wheel 1 can be held in the adjusted position with the sufficient holding force by rotating the adjustment lever 24a upwards. Additionally, even though the steering wheel 1 tends to shift downwards, since the peripheral portion 34 becomes thinner downwards, the steering wheel 1 never shifts to such an extent that causes a problem.

Additionally, since the amount in which the thickness of the peripheral portion 34 is changed should be slight, the work to change the thickness of the peripheral portion 34 can be executed at the same time that the supporting plate portion 15a is punched through pressing to form the vertically elongated hole 17a therein. In addition, there is imposed no limitation on the assembling direction with respect to either of the anchor portion 25 and the driven cam 29. Consequently, neither the production cost nor the assembling costs is increased. Further, the inner surfaces of the anchor portion 25 and the drive cam 29 are individually brought into abutment with the outer surfaces of both the supporting plate portions 15a, 15b over the sufficient area irrespective of the vertical position of the steering wheel. Consequently, the areas of the abutment portions between the inner surfaces of the anchor portion 25 and the driven cam 29 and the outer surfaces of both the supporting plate portions 15a, 15b never become too large. Thus, the inner surfaces and the outer surfaces are restrained from being deformed plastically, thereby making it possible to ensure the smooth adjustment of the vertical position of the steering wheel 1.

INDUSTRIAL APPLICABILITY

The advantage of the invention becomes conspicuous in the construction in which the displacement bracket is provided on the upper side of the steering column. However, the advantage resulting from the application of the invention can be obtained to some extent even in a construction in which the displacement bracket is provided on a lower side of the steering column. Namely, the invention still has room for adopting the construction in which the displacement bracket is provided on the lower side of the steering column.

In addition, a construction is adopted in some vehicles in which an upwardly recessed tunnel-like recess portion is formed in part of a vehicle body (part of a dash board), and a supporting bracket is provided at a lower end opening portion of this recess portion. In the case of this construction, a mounting plate portion is provided at a lower end portion of the supporting bracket, and a pair of left and right supporting plate portions are provided on an upper surface of the mounting plate portion so as to project upwards therefrom. When a displacement bracket is fixed to a lower side of a steering column, the thickness of a vertically elongated hole in an uneven-thickness supporting plate portion is made small at a lower portion and large at an upper portion.

Further, not only the cam device shown in the figures but also a threaded construction which is a conventional widely adopted construction may be adopted for the construction in which the space defined between the anchor portion and the presser member is contracted based on the operation of the adjustment lever with a view to holding the steering wheel in the adjusted position.

While the patent application has been described in detail and by reference to the specific embodiment, it is obvious to those skilled in the art to which the invention pertains that various alterations and/or modifications can be made thereto without departing from the spirit and scope of the invention.

This patent application is based on Japanese Patent Application (No. 2013-004187) filed on Jan. 15, 2013, the contents of which are incorporated herein by reference.

DESCRIPTION OF REFERENCE NUMERALS AND SIGNS 1 steering wheel;
2 steering gear unit;
3 input shaft;
4 tie rod;
5 steering shaft;
6, 6a steering column;
7 universal joint;
8 intermediate shaft;
9 universal joint;
10 electric motor;
11 housing;
12 vehicle body;
13, 13a tilt shaft;
14, 14a supporting bracket;
15, 15a, 15b supporting plate portion;
16, 16a displacement bracket;
17, 17a, 17b vertically elongated hole;
18 through hole;
19, 19a outer column;
20, 20a inner column;
21 slit;
22 held plate portion;
23 tilt rod member;
24, 24a adjustment lever;
25 anchor portion;
26 cam device;
27 first engagement projecting portion;
28 drive cam;
29 driven cam;
30 second engagement projecting portion;
31 nut;
32 thrust bearing;
33 mounting plate portion;
34 peripheral portion;
35 reinforcement plate.

The invention claimed is:
1. A tilt steering system comprising:
a steering column that is swingably movable about a tilt shaft provided in a widthwise direction;
a displacement bracket fixed to an axial intermediate portion of the steering column;
a steering shaft supported rotatably on a bore diameter side of the steering column, the steering shaft fixing a steering wheel to a rear end portion of the steering column;
a first supporting plate portion being suspended downwards from a mounting plate portion provided on a vehicle body;
a second supporting plate portion being suspended downwards from the mounting plate portion and provided so as to be spaced apart from the first supporting plate portion in the widthwise direction;
a supporting bracket supported on the vehicle body by the mounting plate portion in such a state that the displacement bracket is held from both sides of the displacement bracket in the widthwise direction by the first and second supporting plate portions;
a first vertically elongated hole that is long in a vertical direction and is provided in the first supporting plate portion;
a second vertically elongated hole is provided in a portion of the second supporting plate portion, the portion being aligned with the first vertically elongated hole;
through holes that penetrate through portions of the displacement bracket, the portions being aligned with the first and second vertically elongated holes, a tilt rod member which is inserted through the through holes;
an anchor portion provided on the tilt rod member so as to face oppositely a first location on an outer surface of the first supporting plate portion;
a presser member that faces oppositely a second location on an outer surface of the second supporting plate portion so as to expand and contract a space defined between the anchor portion and the presser member based on oscillation of a tilt lever, wherein the mounting plate portion is provided at an upper end portion of the supporting bracket;
a thickness of an upper portion of at least one of the first location and the second location is smaller than a thickness of a lower portion; and
a space defined between the first location and the second location is smaller at a portion near the mounting plate portion than the space at a portion far away from the mounting plate portion.

2. The tilt steering system according to claim 1, wherein the thickness of the lower portion is the same as a thickness of a material of at least one of the first supporting plate portion and the second supporting plate portion.

3. The tilt steering system according to claim 1, wherein a change in thickness from the lower portion to the upper portion is constant along a vertical full length of the first location or the second location.

4. The tilt steering system according to claim 1, wherein the thickness from the lower portion to the upper portion changes at an intermediate portion along the vertical length.

5. The tilt steering system according to claim 1, wherein at least one of the first location and the second location is formed through pressing.

6. The tilt steering system according to claim 5, wherein:
the first location is formed integrally with the first supporting plate portion of the same material as a material of the first supporting plate portion; and
the second location is formed integrally with the second supporting plate portion of the same material as a material of the second supporting plate portion.

* * * * *